United States Patent [19]

Miyauchi et al.

[11] Patent Number: 4,474,686
[45] Date of Patent: Oct. 2, 1984

[54] LITHIUM OXIDE-BASED AMORPHOUS IONIC CONDUCTOR

[75] Inventors: Katsuki Miyauchi, Hino; Keiichi Kanehori, Sayama; Tetsuichi Kudo, Setagaya, all of Japan

[73] Assignee: Hitachi, Ltd., Tokyo, Japan

[21] Appl. No.: 535,834

[22] Filed: Sep. 26, 1983

[30] Foreign Application Priority Data

Sep. 29, 1982 [JP] Japan ................................. 57-168361

[51] Int. Cl.³ .............................................. H01B 1/06
[52] U.S. Cl. ..................................... 252/520; 252/518
[58] Field of Search ...................... 252/520, 518, 182.1; 429/191, 193, 218; 423/593, 641

[56] References Cited

U.S. PATENT DOCUMENTS 4,176,170 11/1979 Kasper et al. ....................... 252/518
4,184,015 1/1980 Reau et al. ........................... 252/518
4,206,088 6/1980 Inoue et al. .......................... 252/518
4,321,163 3/1982 Wahl et al. ........................... 252/518
4,386,020 5/1983 Hartwig et al. ...................... 252/518
4,390,460 6/1983 Mujauchi et al. .................... 252/518

Primary Examiner—Josephine Barr
Attorney, Agent, or Firm—Antonelli, Terry & Wands

[57] ABSTRACT

The invention relates to a lithium oxide-based amorphous ionic conductor which is a ternary composition consisting of $Li_2O$, $SiO_2$ and $ZrO_2$, said composition having a composition of components falling within the range of a quadrilateral defined by two lines corresponding to the $Li_2O$ contents of 80% and 50%, respectively, and by two lines which pass the apex of $Li_2O$ and on which a ratio $SiO_2:ZrO_2$ is 100:0.5 and 1:9, respectively. The conductor is used as a solid electrolyte in the form of a high ionic conductive amorphous thin film.

3 Claims, 2 Drawing Figures

4,474,686

LITHIUM OXIDE-BASED AMORPHOUS IONIC CONDUCTOR

BACKGROUND OF THE INVENTION

This invention relates to a lithium oxide-based amorphous solid. More particularly, the present invention relates to a lithium oxide-based amorphous solid consisting of a $Li_2O/SiO_2/ZrO_2$ composition forming a high ionic conductive thin film.

Recently, lithium ion conductive solid has drawn an increasing attention. Particularly, the lithium ion conductor has been put to practical use as a solid electrolyte of a lithium battery and as an electrolyte of an electrochromic display. The application of the lithium ion conductor as the solid electrolyte of the lithium battery has made a rapid progress in recent years because demands for a battery having a reduced thickness are increasing with miniaturization of electronic devices, especially reduction of their thickness. The application of the lithium ion conductor as the electrolyte of the electrochromic display contemplates to realize an electrochromic display device in the all solid-state arrangement and to stabilize the device characteristics. It is important for both of these applications that a solid electrolyte which has high ionic conductivity and is stable in the normal atmosphere must be developed. In applying the solid electrolyte to all solid-state electrochemical devices, an electrolyte material must be essentially developed which has high chemical stability between a lithium electrode and the electrolyte.

A solid electrolyte thin film material exhibiting high lithium ion conductivity and a method of producing the same are disclosed in Japanese Patent Laid-Open No. 60669/1982 and the like. However, the material disclosed in the prior art reference was not one that has both of the important properties of being high in lithium ion conductivity and highly stable chemically to a lithium metal. For these reasons, all solid-state batteries and all solid ECD's using these electrolytes involve a drawback that their shelf life as well as cycle life are short due to the reaction of the electrolyte with the electrode.

SUMMARY OF THE INVENTION

It is therefore an object of the present invention to provide a lithium oxide-based amorphous ionic conductor which forms a thin film having high ionic conductivity.

This object of the present invention can be accomplished by a lithium oxide-based amorphous ionic conductor comprising a ternary composition consisting of $Li_2O$, $SiO_2$ and $ZrO_2$ forming a high ionic conductive amorphous thin film, which has a composition represented by a zone inside a quadrilateral ABCD with the three $Li_2O$, $SiO_2$, $ZrO_2$ components being the apexes shown in FIG. 1, whereby sides AD and BC are on those lines which correspond to the $Li_2O$ contents of 80% and 50%, respectively, and sides AB and CD are on those lines which pass the apex of $Li_2O$ and on which the ratio $Si_2O:ZrO_2$ is 100:0.5 and 1:9, respectively.

DESCRIPTION OF THE PREFERRED EMBODIMENTS

The range of the composition of the present invention is determined for the following reasons as a result of intensive experiments and trials. First, if $Li_2O$ exceeds 80%, the composition becomes so hygroscopic that it can not be put to practical use. If $Li_2O$ is below 50% and the ratio $SiO_2:ZrO_2$ is out of the range of from 1/9 to 200, the composition has low ionic conductivity.

The composition of the present invention is confirmed to be amorphous by electron diffraction and X-ray diffraction studies of various thin films obtained in the later examples.

As can be confirmed from the later examples, these thin films exhibit high ionic conductivity.

The amorphous solid of the present invention can be produced by the following methods, for example.

(i) It can be obtained by means of sputtering using, as a target, a mixture consisting of lithium silicate ($Li_4SiO_4$), and lithium zirconate ($Li_8ZrO_6$) or $ZrO_2$ and a lithium compound that can form $Li_2O$ by sputtering, such as $LiOH$ or $Li_2CO_3$.

(ii) It can be obtained by means of sputtering using, as a target, a mixture consisting of $SiO_2$, $ZrO_2$ and a lithium compound that can form $Li_2O$ by sputtering.

Figure 1:
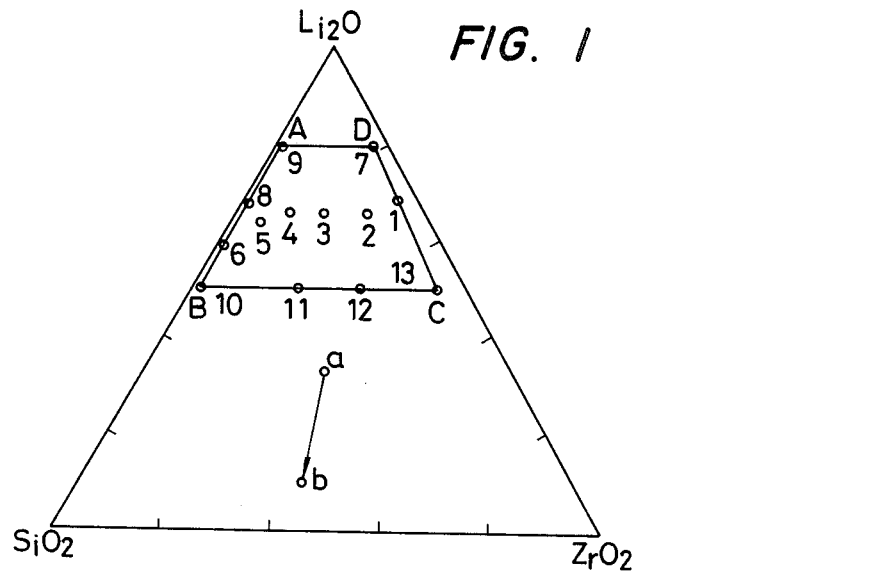
FIG. 1 is a $Li_2O/SiO_2/ZrO_2$ ternary system composition diagram showing the composition in accordance with the present invention.

The term "mixture" used herein means a mixture of powders of components or a mixture of pellets prepared When a thin film is formed by means of sputtering using this mixture target, e.g., a $SiO_2/ZrO_2/Li_2O$ mixture, the composition of the resulting film is one of which the $Li_2O$ content is primarily reduced from that in the target composition. For example, when a thin film is formed using a target having a composition consisting of 0.33 $Li_2O$, 0.33 $SiO_2$ and 0.33 $ZrO_2$ (corresponding to the composition at point a in FIG. 1), the resulting thin film has a composition consisting of 0.10 $Li_2O$, 0.49 $SiO_2$ and 0.41 $ZrO_2$ which is plotted at point b in FIG. 1. If a composition obtained by adding additional 4 moles of $Li_2O$ in excess to the composition corresponding to the point a is used however, the resulting thin film has a composition which is substantially equal to the one at the point a. Furthermore, thin films having closer compositions to the target composition or having a higher $Li_2O$ content than that of the previous target composition can be obtained by increasing quantities of $Li_2O$ and other components to be mixed. In other words, high ionic conductive amorphous thin films having a wide composition range represented by the quadrilateral shown in FIG. 1 can be obtained. $Li_2O$ can be mixed either by uniformly mixing $Li_2O$ powder with a mixture of lithium silicate, zirconia, lithium zirconate and the like, or by disposing $Li_2O$ pellets on said compound target.

The quantity of $Li_2O$ to be mixed is determined in the following way. If it is mixed in large excess, a composition having a high $Li_2O$ content, that is, a composition above a line connecting A and D (on the $Li_2O$ side) in FIG. 1 can be obtained. However, such a composition is not preferable for the practical use because its high hygroscopicity. As can be seen from the later Examples and Comparative Examples, the excessive quantity of $Li_2O$ to be mixed is preferably at most 8 moles per mol of $(1-x)SiO_2 \cdot xZrO_2$. When $Li_2O$ is used in the pellet form, 10 to 30% of the surface area of the target is preferably covered with the $Li_2O$ pellet.

As described already, those lithium compounds which can form $Li_2O$ by sputtering can be used in the same way as $Li_2O$. However, it is not preferred to use these lithium compounds including elements other than lithium and oxygen that react with the product, such as halogens. Accordingly, it is preferred to use at least one Li compound selected from the group consisting of $Li_2O$, $Li_2CO_3$ and LiOH.

The mixture target of the present invention can be used either in the powder form prepared by merely mixing powders of the components or after the components are molded and sintered.

A 1 to 20 μm-thick thin film can be obtained by the method described above. These thin films are suitable for use as a solid electrolyte. They are preferably from 3 to 10 μm thick.

Incidentally, the compositions that are stable with molten lithium and provide a high ionic conductive amorphous solid like those of the present invention are $Li_2O/SiO_2/HfO_2$ and $Li_2O/SiO_2/La_2O_3$ systems.

The present invention will now be described in further detail with reference to Examples thereof.

EXAMPLES 1 TO 6

This films were formed by a sputter-up process using mixtures prepared by blending $Li_4SiO_4$ and $ZrO_2$ coarse powders as illustrated in Table 1 as the target. Meanwhile, an area corresponding to 20% of the surface of the target was covered with $Li_2O$ pellets to compensate for Li that had been lost during sputtering.

TABLE 1

| Example No. | molar fraction of $Li_4SiO_4$ ($Li_4SiO_4/[Li_4SiO_4 + ZrO_2]$) |
|---|---|
| 1 | 0.05 |
| 2 | 0.10 |
| 3 | 0.20 |
| 4 | 0.40 |
| 5 | 0.70 |
| 6 | 0.98 |

An about 2 μm-thick thin film was formed on each silica glass substrate under the sputtering condition of a vacuum of $2 \times 10^{-2}$ mmHg, a discharge gas of $Ar/O_2 = 60/40$, a plate voltage of 2 kV and a film-forming speed of 0.5 μm/h while cooling the substrate with water in order to prevent the rise of the substrate temperature. As a result of chemical analysis, the thin films thus obtained were found to have compositions corresponding to points 1, 2, 3, 4, 5 and 6 in FIG. 1, that is, compositions within the range of the present invention.

Figure 2:
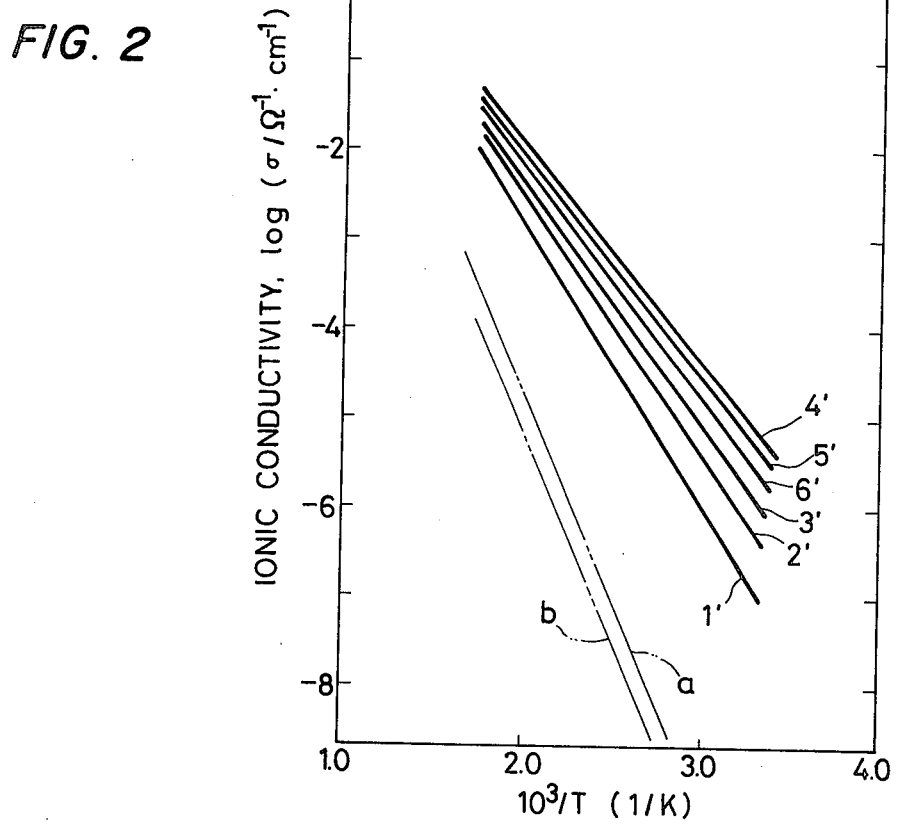
FIG. 2 is a diagram showing changes in the ionic conductivity of the composition of examples of the present invention with temperatures.

Changes in ionic conductivity with temperatures measured by an a.c. method using blocking electrodes of these thin films are shown in FIG. 2. In the drawing, reference numerals 1', 2', 3', 4', 5' and 6' correspond to the compositions represented by reference numerals 1, 2, 3, 4, 5 and 6 in FIG. 1, respectively. For reference, changes in ionic conductivity with temperatures of a $Li_8ZrO_6$ sintered body (a) and a $Li_4SiO_4$ sintered body (b) are also shown in FIG. 2.

As can be seen from FIG. 2, the thin films of the Examples of the present invention are characterized in that they are amorphous, and thin films having arbitrary compositions can be obtained by sputtering. Since they are amorphous, the thin films of the invention exhibit by far higher ionic conductivity than sintered bodies prepared by ordinary processes.

EXAMPLES 7 TO 13

Coarse powders of $Li_4SiO_4$, $ZrO_2$, $SiO_2$ and $Li_8ZrO_6$ were mixed at the blend ratios shown in Table 2 to prepare mixture targets in the same way as in Examples 1 through 6. Sputtering was effected while covering a certain portion of each target surface with $Li_2O$ pellet and the proportions of the surface area occupied by $Li_2O$ are also shown in Table 2.

TABLE 2

| Example No. | target composition mole (%) | | | | percentage surface area occupied by $Li_2O$ on target surface (%) |
|---|---|---|---|---|---|
| | $Li_4SiO_4$ | $Li_8ZrO_6$ | $SiO_2$ | $ZrO_2$ | |
| 7 | 10 | 90 | 0 | 0 | 20 |
| 8 | 90 | 10 | 0 | 0 | 20 |
| 9 | 90 | 10 | 0 | 0 | 30 |
| 10 | 0 | 0 | 85 | 15 | 15 |
| 11 | 0 | 0 | 50 | 50 | 15 |
| 12 | 0 | 0 | 30 | 70 | 13 |
| 13 | 0 | 0 | 5 | 95 | 10 |

The compositions of the resulting thin films and the lithium ion conductivity at room temperature are shown in Table 3.

TABLE 3

| Example No. | thin film composition (mole %) | | | ionic conductivity (room temp.) $(\Omega \cdot cm)^{-1}$ |
|---|---|---|---|---|
| | $Li_2O$ | $SiO_2$ | $ZrO_2$ | |
| 7 | 80 | 2 | 18 | $3.5 \times 10^{-7}$ |
| 8 | 70 | 29.5 | 0.5 | $2 \times 10^{-6}$ |
| 9 | 78 | 21 | 1 | $4 \times 10^{-7}$ |
| 10 | 50 | 48 | 2 | $2 \times 10^{-7}$ |
| 11 | 51 | 30 | 19 | $1.8 \times 10^{-7}$ |
| 12 | 50.5 | 19 | 30.5 | $1.0 \times 10^{-7}$ |
| 13 | 50 | 5 | 45 | $1.5 \times 10^{-7}$ |

The thin films obtained in these Examples 7 through 13 exhibited high lithium ion conductivity substantially equal to that of the thin films obtained in Examples 1 through 6. They had also low hygroscopicity. It was found that they did not react at all with molten lithium and were extremely stable solid electrolyte thin films.

The intensity of reactivity between the Li metal and the solid electrolyte is determined by the magnitude of changes in the free energy of the $Li_2O$ formation reaction. $Li_4SiO_4$ and $Li_8ZrO_6$ as the basic components in the present invention have small changes in the free energy of the reaction and are highly stable. On the other hand, heretofore known solid electrolytes such as $Li_4SiO_4/Li_3PO_4$ or $Li_4GeO_4/Li_3VO_4$ have large changes in the free energy of the reaction and lack the stability. Especially, in view of the application as the solid electrolyte for a secondary battery, the thermodynamic stability with Li becomes an extremely important factor for the battery stability.

As described above, the present invention provides a thin film having extremely high ionic conductivity. Since the thickness of the thin film is incomparably smaller than that of normal bulk materials that are chemically stable, the resistance of a device due to the ionic conductivity can also be reduced extremely greatly. This provides a remarkable effect when the solid electrolyte is applied to a variety of devices. Though the thin film of the present invention is amorphous, it has an ionic conductivity substantially equal to that of a high ionic conductive crystal and is believed to be very promising as a material for various electronic devices because crystallization by heat-treatment is not necessary after sputtering.

What is claimed is:

1. A lithium oxide-based amorphous ionic conductor comprising a ternary composition consisting of $Li_2O$, $SiO_2$ and $ZrO_2$ forming a high ionic conductive amorphous thin film, wherein said composition has a composition of components falling within the range inside a quadrilateral ABCD using said three components $Li_2O$, $SiO_2$ and $ZrO_2$ as the apexes thereof shown in FIG. 1, the side AD being positioned on a line corresponding to the constant $Li_2O$ content of 80%, side AB being positioned on a line which passes the apex of $Li_2O$ and on which the ratio $SiO_2:ZrO_2$ is 100:0.5, the side BC being positioned on a line corresponding to the constant $Li_2O$ content of 50%, and the side DC being positioned on a line which passes the apex of $Li_2O$ and on which the ratio $SiO_2:ZrO_2$ is 1:9.

2. The lithium oxide-based amorphous ionic conductor as defined in claim 1 wherein said amorphous thin film is formed by sputtering the starting materials.

3. The lithium oxide-based amorphous ionic conductor as defined in claim 1 or 2 wherein said amorphous thin film is from 1 to 20 $\mu$m thick.

* * * * *